Patented June 12, 1951

2,556,792

UNITED STATES PATENT OFFICE 2,556,792

BEVERAGE AND PROCESS OF MAKING THE SAME

Frank M. Boyles, Baltimore, Md., assignor to Cloverdale Spring Company, Baltimore, Md., a corporation of Maryland No Drawing. Application November 14, 1949, Serial No. 127,271

20 Claims. (Cl. 99—25)

This invention relates to flavored beverages, such as chocolate drinks, and is particularly concerned with production of a drink having the permanent appearance of a milk drink but which does not require sterilization.

More particularly, the invention provides for the use in flavored drinks of cocoa butter in stable suspension in an aqueous liquid medium.

In the prior art, much attention has been given to the problem of preventing the constituents of chocolate drinks from separating from the liquid medium of the drink. When both cocoa powder and cocoa butter are included, the fibrous particles of the cocoa powder tend to settle out, since they have a specific gravity greater than that of the liquid mediums usually employed. Cocoa butter has a specific gravity less than that of the liquid mediums usually employed, and therefore tends to float to the surface of the drink. While the settling of fibrous particles is not particularly undesirable, and is sometimes considered as a valuable indication to the consumer that chocolate is employed in the drink, floating of the cocoa butter lends an unsightly appearance which makes the drink pratically unsaleable. Though this problem has long been known, it has not as yet, to my knowledge, been satisfactorily solved.

Chocolate drinks now being produced commercially usually include a relatively large amount of a vegetable gum or the like, such material being employed to increase the viscosity of the drink to such an extent as to delay separation of the constituents. This practice is undesirable not only because it does not give a truly stable suspension but also because greatly thickened drinks are often not appealing to the consumer. While a thickened drink of the "chocolate milk" type may be saleable to some extent, it is obviously impractical to greatly increase the viscosity of a water-base drink such as a lightly carbonated chocolate drink.

It has been proposed to prevent the cocoa butter of a chocolate drink from floating by causing minute masses of the butter to be combined in a matrix of hydrated vegetable gum in which is also combined the heavier fibrous particles of cocoa powder. In accordance with this method, which is disclosed in Patent 1,993,511 to Grindrod, the heavier fibrous particles increase the average specific gravity of the matrix to compensate for the lighter cocoa butter, and the average specific gravity of the matrix is made to equal that of the drink. While the Grindrod process has the advantage that it produces a stable drink of normal viscosity, the manipulative steps involved in the process are too complex. Further, the fibrous particles of cocoa are prevented from settling, and the process preferably employs milk, which is often undesirable because it must be sterilized.

The present invention provides flavored drinks including major quantities of cocoa butter wherein the cocoa butter is held in substantially permanent suspension. It eliminates the necessity of using large amounts of vegetable gums or like thickeners, and provides drinks of normal viscosity. The process of the invention is simple, and readily adapted to standard practices in the art.

When aqueous chocolate flavored drinks including both cocoa butter and cocoa powder are prepared in accordance with the invention, all of the cocoa butter of the drink, including that liberated from the cocoa powder, is prevented from floating, while the fibrous particles of the cocoa powder are left free to settle.

This invention is applicable generally to the preparation of drinks including cocoa butter, and the drink may include as the major flavoring material cocoa powder, or both cocoa powder and a second major flavoring such as a coffee product, or the cocoa powder may be entirely omitted in favor of a coffee or other suitable flavoring. Though the invention is unique in that it makes possible the production of a stable suspension of cocoa butter in a water-base drink, the novel features of the invention also apply to drinks containing milk.

When the present invention is employed in the preparation of an aqueous or purely water-base drink including cocoa butter as an essential constituent, the finished drink has an opaque milky appearance not unlike the "chocolate milk" drinks prepared by the more complex prior art methods. Further, this milky appearance remains substantially unchanged after prolonged standing.

Broadly, the invention is directed to drinks in which cocoa butter is present as the dispersed phase of an emulsion in an aqueous liquid medium, and contemplates weighting of the dispersed phase of the emulsion by the inclusion therein of a controlled amount of bromine, so that the average specific gravity of the dispersed phase of the emulsion is substantially equal to that of the drink. Bromine may be incorporated in the dispersed phase of the emulsion by controlled bromination of the cocoa butter employed, or by combining with the cocoa butter a predetermined quantity of a separate brominated weighting material.

In accordance with one embodiment of the invention, cocoa butter to be used in preparing the drink is subjected to bromination, and the reaction so controlled that the brominated product has the desired specific gravity. Of the fatty acids contained in cocoa butter, over 40% are unsaturated, and cocoa butter therefore may be readily brominated by passing bromine gas through a continuously agitated mass of the cocoa butter. The cocoa butter is initially heated to render it fluid, but the reaction is decidedly exothermic and cooling is necessary as the bromination continues. The extent to which the cocoa butter is brominated can be controlled by regulation of the bromine feed, the reaction temperature and the duration of the reaction.

Cocoa butter has a specific gravity less than 1.0, while as will be hereinafter shown a preferred water-base chocolate drink may have a specific gravity in the range 1.03–1.05. Since bromine has a specific gravity of about 2.93, it is obvious that by controlled bromination the specific gravity of the cocoa butter may be adjusted to approximately 1.03–1.05.

In actual practice, the specific gravity of the desired finished drink is calculated and the cocoa butter is then brominated to adjust its specific gravity to that of the drink. The brominated cocoa butter is then mixed with water and an organic emulsifying agent, and the resulting composition subjected to emulsification, as in a conventional high pressure homogenizer. The resulting emulsion is then combined with a syrup produced from cocoa powder and sugar to produce a concentrate. The concentrate may, as is often usual practice, be shipped to a separate location before production of the finished drink. In bottling, the concentrate is diluted with a bottling syrup, and a small predetermined quantity of the bottling syrup introduced into each bottle, whereupon a predetermined amount of the liquid medium is introduced to fill the bottle.

For illustrative purposes, the following example is given for the preparation of a water-base chocolate drink including cocoa butter weighted by bromination.

*Example I*

Cocoa butter is subjected to controlled bromination to bring the specific gravity of the cocoa butter to 1.04. An emulsion is now produced by combining 47 lbs. of the brominated cocoa butter so prepared with 94 lbs. gum arabic and 64 gals. water and subjecting the resulting composition to emulsification in a high pressure homogenizer.

A chocolate concentrate is now prepared by combining the emulsion with a syrup produced from 140 lbs. sugar and 161 lbs. cocoa powder, the following conventional ingredients also being added:

| | |
|---|---|
| Salt | 26 lbs. |
| Benzoic acid | 14 lbs., 8.5 ozs. |
| Propylene glycol | 3 gals. |
| Vanillin | 26 ozs. |
| Coumarin | 5.3 ozs. |
| Sodium alginate | 10 lbs. |

The total composition is combined with sufficient water to make 100 gals. of concentrate, and the product may be handled as any conventional commercial drink concentrate.

A bottling syrup is now prepared by combining 5 gals. of the concentrate with a simple syrup produced by dissolving 82 lbs. sugar in sufficient water to make 13 gals. of simple syrup.

To produce the finished drink, 1.25 ozs. of the bottling syrup is placed in a 7 oz. bottle and the bottle filled with lightly carbonated water.

The completed drink has an opaque milky appearance. Though the fibrous particles of the cocoa powder are free to settle, the general appearance of the drink remains otherwise unchanged after prolonged standing. The drink has a specific gravity of 1.03–1.05 and is not abnormally viscous. The drink has a pleasant rich chocolate flavor.

The brominated cocoa butter is present in the finished drink in the form of minute globules encased in an envelope of the emulsifying agent. Since the specific gravity of the brominated cocoa butter is made approximately equal to that of the drink, these minute globules, which are kept from coalescing by the emulsifying agent, will neither sink nor float.

A certain amount of cocoa butter may be liberated from the cocoa powder and, in drinks made according to prior art methods, this liberated cocoa butter would also eventually float. But, when an emulsion including brominated cocoa butter in the dispersed phase is employed, the cocoa butter liberated from the cocoa powder is taken up by the dispersed phase of the emulsion and is held therein. If such a large amount of liberated cocoa butter results as to upset the balance between the specific gravities of the dispersed phase and the drink, this can be compensated for during weighting of the cocoa butter.

It has been stated that the cocoa butter employed in the drink is weighted by addition of bromine to an extent such that the specific gravity of the cocoa butter content of the drink or, more precisely, the specific gravity of the dispersed phase of the emulsion, is substantially equal to the specific gravity of the finished drink. In theory, it would be desirable if the two specific gravities were identical. But, in actual practice, I have found that it is not necessary to weight the cocoa butter so precisely that the final specific gravities are identical. For example, when the finished drink has a specific gravity of 1.03, the suspension of cocoa butter will be stable if the specific gravity of the weighted cocoa butter is in the range 1.02–1.04.

Since the choice of the emulsifying agent is not critical, the invention is not limited in this respect. Examples of emulsifying agents which may be employed are gum arabic, gum tragacanth, gum karaya, locust bean gum, quinceseed mucilage, pectin, gelatin and lecithin.

Many conventional ingredients can be employed in addition to the ingredients described. The cocoa powder may be replaced wholly or in part by a suitable coffee flavoring. Modifying flavorings, either natural or synthetic, may be included.

In accordance with a second embodiment of the invention, the cocoa butter is similarly emulsified in an aqueous liquid medium, but is unbrominated, and weighting is accomplished by mixing with the unbrominated cocoa butter, prior to emulsification, a predetermined amount of a brominated vegetable fat. Though brominated vegetable fats as a class are useful, it is convenient to employ brominated cocoa butter as the weighting material. The quantity of unbrominated cocoa butter to be incorporated in the drink is first melted and then thoroughly mixed with the brominated vegetable fat. The resulting uniform fluid mixture is combined with an emulsifying agent and water, and the composition emulsified. This emulsion is then employed in making a drink concentrate. The amount of brominated vegetable fat is chosen to make the average specific gravity of the dispersed phase of the emulsion approximately equal to that of the finished drink prepared from the concentrate. The following example will indicate one manner in which the invention may be carried out when a brominated vegetable fat is employed as the weighting material:

*Example II*

An emulsion is prepared from the following ingredients:

| | |
|---|---|
| Cocoa butter | 47 lbs. |
| Brominated cocoa butter (sp. gr. 1.33) | 22–25 lbs. |
| Gum arabic | 140 lbs. |
| Water | 64 gals. |

The unbrominated cocoa butter is melted and thoroughly mixed with the brominated cocoa butter until a uniform fluid mixture results. This mixture is then combined with the gum arabic and water, and the resulting composition emulsified, as in a conventional high pressure homogenizer. The amount of gum arabic is stated as an example only, and is not critical. As little as 70 lbs. of the gum may be employed, or more than 140 lbs. may be employed, though an excessive amount is undesirable because it will raise the viscosity of the finished drink.

The emulsion so prepared is used to prepare a chocolate concentrate by combining the emulsion with a syrup produced from 140 lbs. sugar and 161 lbs. cocoa powder, the following conventional constituents also being added:

| | |
|---|---|
| Salt | 26 lbs. |
| Benzoic acid | 14 lbs. 8.5 ozs. |
| Propylene glycol | 3 gals. |
| Vanillin | 26 ozs. |
| Coumarin | 5.3 ozs. |
| Sodium alginate | 10 lbs. |

To the total composition is added sufficient water to make 100 gals. of concentrate. The concentrate just described is handled as any commercial drink concentrate, and would ordinarily be supplied in bulk to the bottler.

A bottling syrup is now prepared by combining 5 gals. of the concentrate with a simple syrup produced by dissolving 82 lbs. sugar in sufficient water to make 13 gals. of simple syrup.

In bottling, 1.25 ozs. of the bottling syrup just described is placed in a 7 oz. bottle and the bottle filled with lightly carbonated water.

The resulting finished drink has a specific gravity of 1.03–1.05, presents a uniform opaque milky appearance similar to conventional "chocolate milk" drinks, and has an agreeable rich chocolate flavor. Upon prolonged standing, fibrous particles of cocoa powder will settle out, but there is no indication of separation of cocoa butter from the drink, and the drink retains its milky appearance.

In the product of the example just described, the dispersed phase of the emulsion consists of minute globules each composed of both unbrominated and brominated cocoa butter, each globule being surrounded by an envelope of gum arabic. Since the original mixture of unbrominated cocoa butter and brominated cocoa butter was uniform, these two materials are present in each globule of the dispersed phase in substantially the same proportion as in the original mixture. The quantity of brominated cocoa butter, which in this example has a specific gravity of 1.33, is such as to make the specific gravity of the dispersed phase of the emulsion substantially equal to that of the finished drink. The specific gravity of the brominated cocoa butter can, of course, be predetermined by proper control of the bromination. If brominated cocoa butter having a different specific gravity than 1.33 is employed, then the quantity of the brominated cocoa butter must be varied accordingly.

The statement of the various conventional constituents in the example should not be construed as limiting the invention, since they are included here only to illustrate how a drink of a definite specific gravity, depending upon all of the constituents, may include weighted cocoa butter in the dispersed phase of an emulsion.

In accordance with a third embodiment of the invention, unbrominated cocoa butter is weighted with a brominated fixed vegetable oil. All fixed vegetable oils contain substantial amounts of unsaturated fatty acids and can be brominated to bring their specific gravities into the range necessary for weighting cocoa butter. As typical examples of the fixed oils, apricot kernel oil, olive oil, cottonseed oil, corn oil and sesame oil may be mentioned. The brominated fixed vegetable oils are employed in the same manner as the brominated vegetable fats, as will appear from the following example:

*Example III*

An emulsion is prepared from the following constituents:

| | |
|---|---|
| Chocolate liquor | 94 lbs. |
| Brominated apricot kernel oil (sp. gr. 1.33) | 22–25 lbs. |
| Gum arabic | 140 lbs. |
| Water | 64 gals. |

In preparing the emulsion, the brominated apricot kernel oil is mixed with the chocolate liquor, mixing being continued until the composition of the mixture is uniform. The mixture is then combined with the gum arabic and water, and the composition emulsified.

The resulting emulsion is combined with a syrup prepared by cooking 140 lbs. sugar and 114 lbs. cocoa powder, and the following conventional ingredients added:

| | |
|---|---|
| Salt | 26 lbs. |
| Benzoic acid | 14 lbs. 8½ ozs. |
| Propylene glycol | 3 gals. |
| Vanillin | 26 ozs. |
| Coumarin | 5.3 ozs. |
| Sodium alginate | 10 lbs. |

Sufficient water is then added to make 100 gals. of the concentrate.

Using this concentrate, a bottling syrup is prepared, and bottling is carried out, according to the precedure described in Example I.

The completed drink again has a specific gravity in the range 1.03–1.05, and has a permanent milky apparance. After prolonged standing, the fibrous particles of the cocoa powder and chocolate liquor settle out, but there is no apparent separation of the cocoa butter.

In Example III, chocolate liquor is employed instead of pure cocoa butter, and is present in an amount twice that of the cocoa butter of Example II. Chocolate liquor contains substantially 50% by weight cocoa butter. When the chocolate liquor is mixed with the brominated vegetable oil and the mixture emulsified, the cocoa butter of the chocolate liquor is held along with the brominated oil as the dispersed phase of the emulsion.

In Example III, any brominated fixed vegetable oil can be substituted for the brominated apricot kernel oil. Also, the brominated oil need not have a specific gravity of 1.33, it only being necessary that the specific gravity of the brominated oil be substantially above that of the finished drink and that just enough of the brominated oil be present to adjust the average specific gravity of the disperse phase of the emulsion equal to the specific gravity of the completed drink.

In both Example II and Example III, the quantities of the weighting materials are stated as being in the range 22–25 lbs. Actually, 23.5 lbs. of the weighting material will, when the drink is prepared under ideal conditions in accordance with the examples, so weight the cocoa butter as to make the specific gravity of the dispersed phase of the emulsion equal to that of the drink. But, I find that in practice there is an allowable variation of plus or minus 7% in the amount of brominated weighting material added to the cocoa butter.

Whenever cocoa powder is employed in the second and third embodiments mentioned, any cocoa butter released by the cocoa powder in the drink is taken up in the disperse phase of the emulsion. If necessary, of course, the quantity of weighting material employed can be adjusted to compensate for this additional amount of cocoa butter.

As previously pointed out, the invention is not limited to the emulsifying agent given in the examples, any organic protective colloid being useful in place of the gum arabic.

All or part of the cocoa powder specified in the examples may, as previously mentioned, be replaced by a coffee flavoring or a different major flavoring. When this is done, a mild chocolate flavor is still present because of the cocoa butter content of the drink.

The various conventional constituents mentioned in the examples are included only for the purpose of calculating the specific gravity of the drink as a whole, and it will be understood by those skilled in the art that such constituents, except insofar as they affect the specific gravity, do not form any novel function in the invention.

Chemically combined bromine is, in all of the embodiments of the invention, the effective weighting agent for the cocoa butter. Bromine has no adverse physiological effects when employed as described and, if anything, may actually improve the flavor of the product.

I claim:

1. A stable drink comprising cocoa butter present as the dispersed phase of an emulsion in an aqueous liquid medium, said dispersed phase of the emulsion also including bromine chemically combined with a constituent of said dispersed phase, the specific gravity of said dispersed phase being substantially equal to the specific gravity of the drink.

2. A stable drink of the type comprising an emulsion of cocoa butter in an aqueous liquid medium, said drink including as constituents of the dispersed phase of the emulsion cocoa butter and chemically combined bromine, the average specific gravity of the dispersed phase being substantially equal to the specific gravity of the drink.

3. A stable drink comprising an aqueous liquid medium and brominated cocoa butter dispersed therein, said brominated cocoa butter having a specific gravity substantially equal to the specific gravity of the drink.

4. A stable drink comprising an emulsion of cocoa butter in an aqueous liquid medium, said drink including as a constituent of the dispersed phase of the emulsion a quantity of a brominated fixed vegetable oil sufficient to make the average specific gravity of the dispersed phase substantially equal to the specific gravity of the aqueous medium.

5. A stable drink comprising an emulsion of cocoa butter in an aqueous liquid medium, said drink including as a constituent of the dispersed phase of the emulsion a quantity of brominated apricot kernel oil sufficient to make the average specific gravity of the dispersed phase substantially equal to the specific gravity of the aqueous medium.

6. A stable drink comprising an emulsion of cocoa butter in an aqueous liquid medium, said drink including as a constituent of the dispersed phase of the emulsion a quantity of brominated cocoa butter sufficient to make the average specific gravity of the dispersed phase substantially equal to the specific gravity of the aqueous medium.

7. A chocolate flavored water-base drink including cocoa butter and chemically combined bromine as constituents of the dispersed phase of an emulsion in water, the specific gravity of said dispersed phase being substantially equal to the specific gravity of said drink, said drink having a substantially permanent opaque milky appearance.

8. A chocolate flavor aqueous drink including cocoa butter and chemically combined bromine as constituents of the dispersed phase of an emulsion in water, the specific gravity of said dispersed phase being substantially equal to the specific gravity of the drink, said drink also including cocoa powder the fibrous particles of which are free to settle, the drink having a substantially permanent opaque milky appearance and being free from floating cocoa butter.

9. An emulsion for use in preparing drink concentrates, comprising by weight about 510 parts water, 47 parts cocoa butter, 22–25 parts brominated fixed vegetable oil, and at least 70 parts of an organic protective colloid as an emulsifying agent, the cocoa butter, brominated oil and emulsifying agent constituting a dispersed phase having a specific gravity of 1.03–1.05.

10. An emulsion for use in preparing drinks, comprising an aqueous liquid medium, cocoa butter, an organic protective colloid emulsifying agent, and a weighting material selected from the class consisting of the brominated vegetable fats and the brominated fixed vegetable oils, said cocoa butter, weighting material and emulsifying agent constituting the dispersed phase of the emulsion, said dispersed phase having an average specific gravity substantially equal to the specific gravity of the drink to be produced.

11. An aqueous emulsion for use in preparing chocolate drink concentrates, the dispersed phase of which comprises cocoa butter, an organic protective colloid as an emulsifying agent, and a quantity of a brominated fixed vegetable oil sufficient to make the average specific gravity of the dispersed phase 1.03–1.05.

12. A concentrate for making a chocolate flavor drink, including an aqueous liquid medium, cocoa butter, cocoa powder, an organic protective colloid as an emulsifying agent, and a weighting material selected from the group consisting of brominated cocoa butter and the brominated fixed vegetable oils, the cocoa butter, the fatty material released from said cocoa powder and the weighting material being present as the dispersed phase of an emulsion in said aqueous liquid medium, the quantity of said weighting material being just sufficient to make the average specific gravity of said dispersed phase substantially equal to the specific gravity of the desired finished drink.

13. A concentrate for making a chocolate flavor drink, including an aqueous liquid medium, cocoa butter, cocoa powder, a vegetable gum emulsifying agent and brominated apricot kernel oil, said cocoa butter, the fatty material released from said cocoa powder, and said brominated apricot kernel oil being present as the dispersed phase of an emulsion in said aqueous liquid medium, the quantity of said brominated apricot kernel oil being just sufficient to make the average specific gravity of said dispersed phase substantially equal to the specific gravity of the desired finished drink.

14. A concentrate for making a chocolate flavor drink, including an aqueous liquid medium, cocoa butter, cocoa powder, a vegetable gum emulsifying agent and brominated cocoa butter, said cocoa butter, the fatty material released from said cocoa powder, and said brominated cocoa butter being present as the dispersed phase of an emulsion in said aqueous liquid medium, the quantity of said brominated cocoa butter being just sufficient to make the average specific gravity of said dispersed phase substantially equal to the specific gravity of the desired finished drink.

15. In a process for producing an aqueous drink including a stable suspension of cocoa butter in an aqueous liquid medium, the steps of producing a uniform fluid mixture of cocoa butter and a weighting material selected from the class consisting of brominated cocoa butter and brominated fixed vegetable oils, combining said mixture with an organic protective colloid as an emulsifying agent and emulsifying the resulting product in an aqueous liquid medium, combining the emulsion with a syrup produced from cocoa powder and sugar, and adding sufficient aqueous liquid medium to produce a finished drink of the desired consistency, the amount of said weighting material employed being just sufficient to cause the average specific gravity of the dispersed phase of the emulsion so produced to be substantially equal to the specific gravity of the finished drink.

16. In a process for producing a chocolate drink including a stable suspension of cocoa butter in an aqueous liquid medium, the steps of producing a uniform fluid mixture of cocoa butter and 43–57% by weight of the cocoa butter of a brominated weighting material selected from the class consisting of brominated cocoa butter and the brominated fixed vegetable oils and having a specific gravity of 1.3, combining the resulting mixture with an organic protective colloid as an emulsifying agent, emulsifying the resulting product in an aqueous liquid medium to produce an emulsion in which the cocoa butter and weighting material constitute the dispersed phase, combining the resulting emulsion with a syrup produced from cocoa powder and sugar, and combining the resulting composition with sufficient aqueous liquid medium to produce a drink having a specific gravity in the range 1.03–1.05.

17. A process for producing a stable aqueous drink, comprising the steps of producing a uniform fluid mixture of cocoa butter and brominated apricot kernel oil, combining this mixture with an organic protective colloid as an emulsifying agent, emulsifying the resulting composition in an aqueous liquid medium, combining the emulsion with a syrup produced from sugar and a major flavoring material to produce a drink concentrate, and finally adding sufficient aqueous medium to produce the desired finished drink, said brominated apricot kernel oil being employed in an amount just sufficient to make the specific gravity of the dispersed phase of said emulsion substantially equal to the specific gravity of the finished drink.

18. A process for producing a chocolate drink concentrate for use in preparing a stable aqueous drink having a predetermined specific gravity, comprising the steps of producing a uniform fluid mixture of cocoa butter and a weighting material selected from the class consisting of the brominated vegetable fats and the brominated fixed vegetable oils, emulsifying said mixture in an aqueous liquid, and combining the resulting emulsion with a syrup produced from sugar and cocoa powder, said weighting material being employed in an amount just sufficient to make the average specific gravity of the dispersed phase of said emulsion substantially equal to the predetermined specific gravity of the drink to be produced from said concentrate.

19. A process for producing a stable aqueous drink, comprising emulsifying in an aqueous liquid brominated cocoa butter having a specific gravity substantially equal to the specific gravity of the desired drink, combining said emulsion with a flavoring material, and adding a predetermined quantity of an aqueous liquid medium to produce the desired finished drink.

20. In a process for producing a stable water-base drink, the steps comprising first forming a uniform mixture of cocoa butter and a weighting material selected from the class consisting of the brominated vegetable fats and the brominated fixed vegetable oils, combining this mixture with an organic protective colloid as an emulsifying agent, emulsifying the resulting composition in water, combining the emulsion with a syrup produced from sugar and a major flavoring agent, and adding an aqueous liquid medium to produce the finished drink, said weighting material being employed in an amount just sufficient to make the average specific gravity of the dispersed phase of the emulsion equal to the average specific gravity of the drink.

FRANK M. BOYLES.

REFERENCES CITED

The following references are of record in the file of this patent:

UNITED STATES PATENTS

| Number | Name | Date |
| --- | --- | --- |
| 1,710,508 | North | Apr. 23, 1929 |
| 2,296,180 | Pashkow | Sept. 15, 1942 |